United States Patent
Dogterom et al.

(10) Patent No.: US 7,507,770 B2
(45) Date of Patent: *Mar. 24, 2009

(54) PROCESS FOR THE PRODUCTION OF HYDROCARBONS

(75) Inventors: Ronald Jan Dogterom, Amsterdam (NL); Robert Adrianus Wilhelmus Grotenbreg, Amsterdam (NL); Gerardus Petrus Lambertus Niesen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 5 days.

This patent is subject to a terminal disclaimer.

(21) Appl. No.: 11/666,778

(22) PCT Filed: Nov. 2, 2005

(86) PCT No.: PCT/EP2005/055705

§ 371 (c)(1),
(2), (4) Date: May 1, 2007

(87) PCT Pub. No.: WO2006/048424

PCT Pub. Date: May 11, 2006

(65) Prior Publication Data

US 2008/0009553 A1  Jan. 10, 2008

(30) Foreign Application Priority Data

Nov. 3, 2004  (EP)  .................................. 04105501

(51) Int. Cl.
*C07C 27/00* (2006.01)
*B01J 23/00* (2006.01)
*C07C 5/13* (2006.01)

(52) U.S. Cl. ........................ 518/715; 502/313; 502/325; 585/750

(58) Field of Classification Search ................. 502/242, 502/313, 324, 325, 326, 439; 518/700, 711, 518/715; 585/640, 734, 750
See application file for complete search history.

(56) References Cited

U.S. PATENT DOCUMENTS

| 4,085,193 A | | 4/1978 | Nakajima et al. ............ 423/239 |
| 5,484,757 A | * | 1/1996 | Szymanski et al. .......... 502/439 |
| 5,750,819 A | * | 5/1998 | Wittenbrink et al. ........ 585/734 |

FOREIGN PATENT DOCUMENTS

| JP | 52023588 | | 2/1977 |
| WO | WO 99/34917 | * | 7/1999 |
| WO | WO9934917 | | 7/1999 |

* cited by examiner

*Primary Examiner*—Porfirio Nazario Gonzalez
*Assistant Examiner*—Yate' K Cutliff

(57) ABSTRACT

A process for the preparation of a titania catalyst or a titania catalyst carrier is described. It comprises the steps of: obtaining a wet filtercake of titania, the titania having been made by hydrolysis of a suitable titanium compound, optionally admixing the wet filtercake with one or more catalyst materials, extruding said filtercake or said admixture, and drying and/or calcining the so-formed extrudate. The wet filtercake of titania can be provided from any known route or source or reaction. These include the the wet chloride or sulphate processes. The present invention removes the need for current separate drying and calcination of the titania sulphate product prior to its admixture with a catalyst material. It provides a catalyst with increased strength, which catalyst has also been found to provide greater catalytic activity, especially in C5+ selectivity.

19 Claims, No Drawings

PROCESS FOR THE PRODUCTION OF HYDROCARBONS

PRIORITY CLAIM

The present application claims priority to European Patent Application 04105501.3 filed 3 Nov. 2004.

FIELD OF THE INVENTION

The present invention relates to a process for the preparation of a titania catalyst or titania catalyst carrier or a titania-supported catalyst, and a process of the preparation of hydrocarbons from synthesis gas using the new catalyst.

BACKGROUND OF THE INVENTION

Titania (or titanium dioxide) is a well-known white inorganic pigment, and two main processes are used to prepare titania on a commercial scale, namely the so-called "chloride process" and the so-called "sulphate process".

In the "chloride process", titanium-containing raw materials are chlorinated at 700-1200° C. Titanium tetrachloride is separated from the other chlorides by distillation. The titanium tetrachloride, optionally after further purification, is burnt with an oxygen containing gas at temperatures between 900-1400° C. to form titania.

In the "sulphate process", the titanium-containing raw material is dissolved in concentrated sulphuric acid at 150-220° C. Removal of insolubles and precipitation of iron sulphates results in a concentrated titanyl sulphate solution. Relatively pure titania dihydrate is precipitated by hydrolysis of the sulphate solution at about 100° C. The remaining impurities, especially metal sulphates, are largely removed in further purification stages, especially by washing with diluted acid or by bleaching. The hydrate can be filtered until a titania content of 30-40 wt % is obtained. Then the filtrate is dried, calcined, ground and further treated, depending on the type of application.

Besides the use of titania as a pigment, it has other applications. One is as use as a catalyst itself in certain chemical reactions. Another application is the use as a catalyst carrier or support.

One area of use of titania-based catalyst carriers is the catalytic preparation of hydrocarbons from a gaseous mixture comprising carbon monoxide and hydrogen, generally known as the Fischer-Tropsch process.

The Fischer-Tropsch process can be used for the conversion of hydrocarbonaceous feed stocks into liquid and/or solid hydrocarbons. The feed stock (e.g. natural gas, associated gas, coal-bed methane, residual oil fractions, biomass and/or coal) is converted in a first step into a mixture of hydrogen and carbon monoxide (this mixture is often referred to as synthesis gas or syngas). The synthesis gas is then fed into a reactor where it is converted in a single step over a suitable catalyst at elevated temperature and pressure into paraffinic compounds ranging from methane to high molecular weight modules comprising up to 200 carbon atoms, or, under particular circumstances, even more.

Catalysts used in the Fischer-Tropsch synthesis often comprise a titania based support material and one or more metals from Group VIII of the Periodic Table, especially from the iron group, optionally in combination with one or more metal oxides an/or metals as promoters. Particular interest has been given to catalysts comprising cobalt as the catalytically active component, in combination with one or more promoters selected from zirconium, titanium, chromium, vanadium rhenium, platinum and manganese. Such catalysts are known in the art and have been described for example, in the specifications of International Patent Application No. WO A-9700231 and United States Patent publication No. U.S. Pat. No. 4,595, 703.

There is a continuous interest in more efficient ways to prepare catalysts carriers and/or catalysts, especially titania based carriers and catalyst. In addition there is a continuous interest in the preparation of catalysts having increased strength, activity and/or selectivity. As discussed above, titania catalyst carrier is either prepared by a high temperature process or in a relatively low temperature process followed by calcination. In a second step the carrier material is admixed with catalyst materials, shaped and dried/calcined. Calcination is in particular needed to make strong catalyst particles.

It has now been found that titania catalyst (carrier) and titania-supported catalysts can be obtained by the hydrolysis of a suitable titanium compound, followed by filtration to obtain a wet filtercake of titania and use of the wet filter cake in the catalyst (carrier) preparation.

SUMMARY OF THE INVENTION

The present invention provides a process for the preparation of a titania catalyst or titania catalyst carrier or a titania-supported catalyst comprising the steps of:

obtaining a wet filtercake of titania, the titania having been made by hydrolysis of a suitable titanium compound, optionally admixing the wet filtercake with one or more catalyst materials, extruding said filtercake or said admixture, and drying and/or calcining the so-formed extrudate.

Thus, a catalyst or catalyst carrier is prepared which does not require additional drying, calcining, etc. steps after the hydrolysis of the titanium compound. The catalyst or catalyst carrier so-formed also has greater strength, activity and selectivity as discussed hereinafter when compared with catalyst made from dried and calcined titania powder.

The effect of the calcination treatment is to remove crystal water, to decompose volatile decomposition products, and to convert organic and inorganic compounds to their respective oxides. Calcination also results in stronger particles.

DETAILED DESCRIPTION OF THE INVENTION

The calcination of the extrudate is normally carried out at a temperature in the range between 300° C. and 1000° C. Preferably, the calcination is carried out at a temperature in the range of from 450° C. to 750° C., more preferably in the range of from 475° C. to 725° C. The duration of the calcination treatment is typically from 0.5 to 24 hours, preferably from 1 to 4 hours. Suitably, the calcination treatment is carried out in an oxygen-containing atmosphere, preferably air.

The extrudate may also be dried prior to calcination. Drying is typically carried out at a temperature of up to 300° C., suitably 50-200° C. for under 24 hours, preferably 1 to 4 hours.

After calcination, the resulting catalyst may be activated by contacting the catalyst with hydrogen or a hydrogen-containing gas, typically at temperatures of about 100 to 500° C., generally 200 to 350° C.

The wet filtercake of titania can be provided from any known hydrolysis reaction or source. These include the the wet chloride or sulphate processes. Briefly, the wet chloride process involves the hydrolysis of titanium tetrachloride, e.g. by heating with water the addition of hydrochloric acid, from which a wet filtercake can be precipitated. Alternatively, the sulphate process involves the addition of sulphuric acid to form titanium sulphate, from which a wet filtercake can be formed by hydrolysis, e.g. by adding sodium hydroxide, to form a precipitate. The hydrolysis reaction is well known in the literature. Also the filtration step has been described in the literature.

A further source of wet filtercake of titania is the aqueous hydrolysis of any dissolved titanium-containing material, including titania in crystalline or amphorous form. Again, in the prior art, such material would have been dried and calcined prior to use. In the present invention, such material can be slurried with a suitable solvent, such as a base or a suitable acid, which provides easier hydrolysis. The crystallinity may vary considerably (20 to 90 wt %), and the total water may also vary considerably. Preferably, the solvent is acidic, so that the filtercake is acidic (pH 1 to 6, preferably 2 to 5). This wet material is then ready for use in the process of the present invention without requiring any further treatment steps, thereby saving in the overall production costs. The wet filtercake is not prepared from a titania precursor in a process which requires an intermediate calcination step.

A "wet filtercake" is generally defined in the art as filtercake having approximately 10-50% by weight of liquid, generally free water, or other solvent such as methanol or the like. Generally, more than 1% is water bound with the titania, preferably 2-10%, based on dry weight of the titania therein.

Optionally, the wet filtercake can be washed with an ammonia or an ammonia-releasing compound, such as an aqueous solution comprising one or more ammonium compounds, possibly at elevated temperature, to reduce contaminants, in particular sulphates.

Examples of this form of washing are disclosed in WO 03/018481.

Preferably, the admixing of the wet filtercake of titania and the one or more catalyst materials is carried out by mixing, mulling and/or kneading.

A kneading/mulling method for the preparation of a catalyst using titania as catalyst carrier can be performed comprising the following steps: (a) mixing the titania, filtercake, and a Group VIII containing compound catalyst material, with or without optional promoters, and which is at least partially (>50%, preferably >80%, or even >90%) insoluble in the amount of liquid used, to form a mixture, (b) extrusion shaping and drying of the mixture thus-obtained, and (c) calcination of the mixture thus-obtained.

The liquid may be any of suitable liquids known in the art, for example water; ammonia; alcohols, such as methanol, ethanol and propanol; ketones, such as acetone; aldehydes, such as propanol, and aromatic solvents, such as toluene. A most convenient and preferred liquid is water.

Typically, the ingredients of the mixture are mulled for a period of from 5 to 120 minutes, preferably from 15 to 90 minutes. During the mulling process, energy is put in to the mixture by the mulling apparatus. The mulling process may be carried out over a broad range of temperature, preferably from 15 to 90° C. As a result of the energy input into the mixture during the mulling process, there will be a rise in temperature of the mixture during mulling. Any suitable, commercially available mulling machine may be employed. The amount of energy is suitably between 0.05 and 50 Wh/min/kg, preferably between 0.5 and 10 Wh/min/kg.

To improve the flow properties of the mixture, it is preferred to include one or more flow improving agents and/or extrusion aids in the mixture prior to extrusion. Suitable additives for inclusion in the mixture include organic acids, fatty amines, quaternary ammonium compounds, polyvinyl pyridine, sulphoxonium, sulphonium, phosphonium and iodonium compounds, alkylated aromatic compounds, acyclic mono-carboxylic acids, fatty acids, sulphonated aromatic compounds, alcohol sulphates, ether alcohol sulphates, sulphated fats and oils, phosphonic acid salts, polyoxyethylene alkylphenols, polyoxyethylene alcohols, polyoxyethylene alkylamines, polyoxyethylene alkylamides, polyacrylamides, polyols and acetylenic glycols. Preferred additives are sold under the trademarks Nalco and Superfloc.

To obtain strong extrudates, it is preferred to include in the mixture, prior to extrusion, at least one compound which acts as a peptising agent for the titania. Suitable peptising agents for inclusion in the extrudable mixture are well known in the art and include basic and acidic compounds. Examples of basic compounds are ammonia, ammonia-releasing compounds, ammonium compounds or organic amines. Such basic compounds are removed upon calcination and are not retained in the extrudate to impair the catalytic performance of the final product. Preferred basic compounds are organic amines or ammonium compounds. A most suitable organic amine is ethanol amine. Suitable acidic peptising agents include weak acids, for example formic acid, acetic acid, oxalic acid, and propionic acid.

Optionally, burn-out materials may be included in the mixture, prior to extrusion, in order to create macropores in the resulting extrudates. Suitable burn-out materials are commonly known in the art.

The total amount of flow-improving agents/extrusion aids, peptising agents, and burn-out materials in mixture preferably is in the range of from 0.1 to 20% by weight, more preferably from 0.5 to 10% by weight, on the basis of the total weight of the mixture. Examples of suitable catalyst preparation methods as described above are disclosed in WO-A-9934917.

The titania catalyst prepared by the present invention can be used in any chemical reaction known to involve titania catalysts, such as the hydrolysis of hydrogen cyanide.

A titania catalyst carrier prepared by the present invention can be used to support one or more catalyst materials, such materials generally being other than titania. In one embodiment of the present invention, the other catalyst material is preferably a Group VIII metal or Group VIII metal compound, and is more preferably a cobalt containing compound. Any cobalt compound of which at least 50% by weight is insoluble in the amount of the liquid used, can be suitably used in the method of the present invention. Preferably, at least 70% by weight of the cobalt compound is insoluble in the amount of liquid used, more preferably at least 80% by weight, still more preferably at least 90% by weight. Examples of suitable cobalt compounds are metallic cobalt powder, cobalt hydroxide, cobalt oxide hydroxide, cobalt oxide or mixtures thereof. Preferred cobalt compounds are $Co(OH)_2$ or $Co_3O_4$. Other catalytically active metals include ruthenium, iron and nickel.

The amount of catalyst material, for example cobalt compound, present in the mixture may vary widely. Typically, the mixture comprises up to 40 wt % cobalt relative to the total amount of catalyst, preferably 10-30 wt %. The above amounts of cobalt refer to the total amount of cobalt on the basis of cobalt metal, and can be determined by known elemental analysis techniques. The cobalt compound may further comprise a Group IVb and/or a Group VIIb compound, preferably a zirconium, manganese or rhenium compound. The most preferred cobalt-containing compound is a mixed cobalt manganese hydroxide.

The present invention further provides a catalyst whenever prepared by a process as herein described, especially where the catalyst material is cobalt or a cobalt compound.

The present invention also provides use of a catalyst as formed by the present invention in a hydrocarbon conversion process, a hydrogenation process, a hydrocarbon synthesis reaction, or in the purification of exhaust gases.

The invention is particularly directed to use of a catalyst formed by the present invention in a Fischer-Tropsch process, wherein the catalyst is used to catalyse the conversion of a mixture of carbon-monoxide and hydrogen into a paraffin wax comprising product.

The mixture of carbon monoxide and hydrogen, also referred to as synthesis gas or syngas, is prepared from a (hydro)carbonaceous feeds, for example, coal, bio-mass, mineral oil fractions and gaseous hydrocarbon sources. Preferred hydrocarbonaceous feeds for the preparation of synthesis gas are natural gas and/or associated gas. As these feedstocks, after partial oxidation and/or steam reforming, usually result in synthesis gas having $H_2/CO$ ratios of about 2, cobalt is a very good Fischer-Tropsch catalyst as the user ratio for this type of catalyst is also about 2 but may be as low as 1.

The present invention further provides synthesis of hydrocarbons using a catalyst formed by the present invention. The Fischer-Tropsch catalytic conversion process may be performed under conventional synthesis conditions known in the art. Typically, the catalytic conversion may be effected at a temperature in the range of from 150 to 300° C., preferably from 180 to 260° C. Typical total pressures for the catalytic conversion process are in the range of from 1 to 200 bar absolute, more preferably from 10 to 70 bar absolute. In the catalytic conversion process especially, more than 75 wt % preferably more than 85 wt %, of C5+ hydrocarbons are formed.

Depending on the catalyst and the conversion conditions, the amount of heavy wax ($C_{20}$+) may be up to 60 wt %, sometimes up to 70 wt %, and sometimes even up to 80 wt %. Preferably, a cobalt catalyst is used, a low $H_2/CO$ ratio is used (especially 1.7, or even lower) and a low temperature is used (180-260° C., preferably 190-230° C.). To avoid any coke formation, it is preferred to use an $H_2/CO$ ratio of at least 0.3. It is especially preferred to carry out the Fischer-Tropsch reaction under such conditions that the SF-alpha value, based on the obtained linear products having 20 carbon atoms and having 40 carbon atoms, is at least 0.925, preferably at least 0.935, more preferably at least 0.945, even more preferably at least 0.955. Preferably the Fischer-Tropsch hydrocarbons stream comprises at least 35 wt % $C_{30}$+, preferably 40 wt %, more preferably 50 wt %.

The Fischer-Tropsch process may be a slurry FT process or a fixed bed FT process, especially a multitubular fixed bed, preferably a three phase fluidised bed process.

The final amount of catalyst material(s) on the titania carrier is preferably in the range of from 3 to 300 pbw per 100 pbw of carrier, more preferably from 10 to 80 pbw, especially from 15 to 60 pbw.

If desired, the catalyst may also include one or more metals or metal oxides as promoters. Suitable metal oxide promoters may be selected form Groups IIA, IIB, IVB, VB, VIB of the Periodic Table or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are very suitable promoters.

Suitable metal promoters may be selected from Groups VIIB or VIII or the Periodic Table. Rhenium and Group VIII noble metals are particularly suitable, with platinum and palladium being especially preferred. The amount of promoter present in the catalyst is suitably in the range from 0.01 to 100 pbw, preferably 0.1 to 40, more preferably 1 to 20 pbw, per 100 pbw of carrier. The most preferred promoters are selected from vanadium, manganese, rhenium, zirconium and platinum.

The present invention further provides a hydrocarbon product whenever prepared by a synthesis as herein described.

The nature of the present invention is such that prior to calcination, the extruded admixture of titania wet filtercake and catalyst material(s), with or without any further components such as promoters, flow improving agents, etc., could be considered as a catalyst precursor. Calcination of the precursor leads to a catalyst of the present invention.

The present invention also provides a process for the preparation of a titania catalyst precursor or titania catalyst carrier precursor comprising the steps of:

obtaining a wet filtercake of titania, optionally admixing the wet filtercake with one or more catalyst materials, and extruding said admixture.

The titania catalyst carrier can then be used in a manner known in the art for carrying or supporting one or more catalyst material(s), such as the catalyst material(s) used in the Fischer-Tropsch process. The titania catalyst carrier prepared by this process has reduced impurity content, especially reduced sulphur content, compared with existing preparations of titania, and will therefore be improved over the disadvantages discussed above.

Catalytic material suitable for slurry FT reactions can be made by grinding and sieving the material obtained in the above process, e.g. the extrusion process. A sieve fraction of particles having a diameter of 10-100 micron can be prepared. This fraction shows the same advantageous preparation as extruded material.

The present invention further provides use of a titania catalyst or titania catalyst carrier whenever formed by a process as hereinabove described, in a catalytic process, especially a hydrocarbon conversion process, for example Fischer-Tropsch process.

The invention is further illustrated by the following example, which, however, should not be used to restrict the scope of the invention in any way.

EXAMPLE 1

A mixture was prepared containing 325 g titania wet filter cake (loi 34.3% wt), 103 g CoMn(OH)x co-precipitate (atomic ratio Mn/Co=0.057) and 2.3 g of an acidic peptising agent such as an organic acid. As extrusion aid 4.5 g polyvinyl alcohol was used. The mixture was kneaded for 26 minutes. The loss on ignition (loi) of the mix was 30.3% wt. The mixture was shaped using a 1-inch Bonnot extruder, supplied with a 1.7 mm trilobs plug.

The obtained extrudates were dried at 120° C. for 2 hours and calcined at 550° C. for 2 hours.

REFERENCE EXAMPLE 1

Titania powder was obtained after drying of the wet filter cake at 120° C. for 72 hours.

A mixture was prepared containing 224 g of this titania powder, 103 g CoMn(OH)x co-precipitate (atomic ratio Mn/Co=0.057), 2.3 g of an acidic peptising agent, 90 g of a 5 w % polyvinyl alcohol solution (demiwater based) and 16 g demiwater. The mixture was kneaded for at least 26 minutes (the actual kneading time was 44 minutes; however, an optimum dispersion of all components is reached within 26 minutes, and further kneading does not improve the catalyst performance). The loss on ignition (loi) of the mix was 31.0% wt. The mixture was shaped using a 1-inch Bonnot extruder, supplied with a 1.7 mm trilobs plug.

The obtained extrudates were dried at 120° C. for 2 hours and calcined at 550° C. for 2 hours.

TABLE 1

|  | Example 1 | Reference Example 1 |
|---|---|---|
| Pressure (Bar) | 32 | 32 |
| Temp (° C.) | 208 | 208 |
| Runhours compared | 19-44 | 20-42 |
| Activity STY (g/l/h) | 151 | 122 |
| Selectivity $C_5+$ (% w) | 91.5 | 87.5 |
| Activity Coeff. | 1.28 | 1.03 |
| Strength FPCS N/cm | 298 | 101 |

Table 1 details a number of conditions and results in comparing the catalyst performance of the catalyst prepared by Example 1, and the catalyst prepared by Reference Example 1.

As can be seen, each test was carried out at the same pressure and temperature, and for approximately the same run-hours.

It is clear that Example 1 provides a number of superior results over the catalyst of Reference Example 1. In one regard, the STY (space/time yield) activity of the catalyst of Example 1 was 151 g/l/h, compared with 122 g/l/h of Reference Example 1, a 27% increase.

In another aspect shown by Table 1, the $C_5+$ selectivity of hydrocarbons prepared having a carbon chain link from at least five carbon atoms, has increased from 87.5% weight of the total product using the Reference Example 1 catalyst, to 91.5% by weight of total product for the Example 1 catalyst. On the large industrial scale of the Fischer-Tropsch process, this is a significant yield increase, and thus a significant economic advantage.

The activity coefficient of the catalyst of Example 1 compared with that of Reference Example 1 has also increased from 1.03 to 1.28.

Table 1 also shows an the increase in strength of the catalyst of Example 1 compared with that of the catalyst of Reference Example 1. The strength has increased from 101 N/cm to 298 N/cm, a near 200% increase in strength. With this increase in strength, there is significant reduction in the crushing of the catalyst in reactor tubes, especially reactor tubes which are long and high such as those used in the Fischer-Tropsch process. This leads to a significant reduction in the incidences of catalyst breakdown in reactor tubes, and therefore loss of efficiency and through-put. With regard to the large industrial scale of many catalytic processes, any reduction in the incidences of catalyst crushing, significantly increases the consistency of reaction, and therefore yield of product, on a significant economic scale.

The catalysts prepared in Example 1 and Reference Example 1 were tested using a Fischer-Tropsch process, involving the input of a mixture of hydrogen and carbon monoxide in a manner known in the art.

The present invention provides a number of advantages. Firstly, it removes the need for current separate drying and calcination of the titania sulphate product prior to its admixture with a catalyst material, and subsequent second calcination. Thus, the present invention more easily and quickly provides a catalyst product by the integration of catalyst carrier and catalyst material prior to calcination, as opposed to the pre-forming of the titania catalyst material, which subsequently requires further process steps for its combination with one or more catalyst materials.

As described above a second advantage is providing a catalyst with increased strength. Reactor tubes for catalytic processes such as the Fischer-Tropsch process can often be high, such as for example 12 metres high, and with a narrow cross-section. Significant strength is required by the catalyst to support itself in such elongate tubes without crushing. By admixing the titania and the catalyst material(s) in a wet form, better mixing of the components is obtained as compared with mixing the same components as dry materials. This better admixture provides increased flat plate crushing strength, that is, the force which an extrudate can endure when crushed within two flat plates. With increased crushing strength, the catalyst prepared by the present invention is less likely to collapse in a reactor tube, thereby either stopping the reaction, or significantly impairing catalytic activity and therefore efficiency.

A third advantage provided by the present invention is that the catalyst of the present invention has been found to provide greater catalytic activity, especially in $C_5+$ selectivity.

What is claimed is:

1. A process for producing hydrocarbons from synthesis gas at elevated temperature and pressure using a catalyst prepared according to a process comprising the steps of:
    obtaining a wet filtercake of titania, the titania having been made by hydrolysis of a suitable titanium compound;
    admixing the wet filtercake with one or more catalyst materials;
    extruding said admixture; and
    drying and calcining the so-formed extrudate, said process comprising passing synthesis gas over said catalyst at an elevated temperature and pressure.

2. A process as claimed in claim 1 wherein the wet filtercake of titania is hydrated titania.

3. A process as claimed in claim 2 wherein the hydrated titania is obtained from the hydrolysis of titanyl sulphate formed by the reaction of titanium-containing material and sulphuric acid.

4. A process as claimed in claim 1 wherein the wet filtercake of titania is obtainable by slurrying titanium-containing material with one or more solvents.

5. A process as claimed in claim 1 wherein the catalyst material comprises a Group VIII metal or Group VIII metal compound.

6. A process as claimed in claim 1 wherein the wet filtercake of titania is washed with ammonia or an ammonia-releasing compound prior to admixture with the catalyst material(s).

7. A process as claimed in claim 1 wherein the admixing of the wet filtercake of titania and the one or more catalyst materials is carried out by mixing, mulling and/or kneading.

8. A process as claimed in claim 1 wherein one or more promoters are added to the filtercake and catalyst material(s) prior to extrusion.

9. A process as claimed in claim 1 further comprising a hydroconversion process.

10. A process for producing hydrocarbons from synthesis gas at elevated temperature and pressure using a catalyst prepared according to a process comprising the steps of:

obtaining a wet filtercake of titania made by slurrying a titanium-containing material with one or more solvents, the titania having been made by hydrolysis of a suitable titanium compound;

admixing the wet filtercake with one or more catalyst materials;

extruding said admixture; and drying and calcining the so-formed extrudate, said process comprising passing synthesis gas over said catalyst at an elevated temperature and pressure.

11. A process as claimed in claim 10 wherein the wet filtercake of titania is hydrated titania.

12. A process as claimed in claim 11 wherein the hydrated titania is obtained from the hydrolysis of titanyl sulphate formed by the reaction of titanium-containing material and sulphuric acid.

13. A process as claimed in claim 10 wherein the catalyst material comprises a Group VIII metal or Group VIII metal compound.

14. A process as claimed in claim 10 wherein the wet filtercake of titania is washed with ammonia or an ammonia-releasing compound prior to admixture with the catalyst material(s).

15. A process for producing hydrocarbons from synthesis gas at elevated temperature and pressure using a catalyst prepared according to a process comprising the steps of:

obtaining a wet filtercake of titania, the titania having been made by hydrolysis of a suitable titanium compound;

admixing the wet filtercake with one or more catalyst materials comprising a Group VIII metal or Group VIII metal compound;

extruding said admixture; and drying and calcining the so-formed extrudate, said process comprising passing synthesis gas over said catalyst at an elevated temperature and pressure.

16. A process as claimed in claim 15 wherein the wet filtercake of titania is hydrated titania.

17. A process as claimed in claim 16 wherein the hydrated titania is obtained from the hydrolysis of titanyl sulphate formed by the reaction of titanium-containing material and sulphuric acid.

18. A process as claimed in claim 16 wherein the wet filtercake of titania is washed with ammonia or an ammonia-releasing compound prior to admixture with the catalyst material(s).

19. A process as claimed in claim 15 further comprising a hydroconversion process.

* * * * *